United States Patent
Ito et al.

(10) Patent No.: US 7,373,333 B2
(45) Date of Patent: May 13, 2008

(54) INFORMATION PROCESSING APPARATUS AND METHOD, PROGRAM STORAGE MEDIUM AND PROGRAM

(75) Inventors: Masato Ito, Tokyo (JP); Jun Tani, Kanagawa (JP)

(73) Assignees: Sony Corporation, Tokyo (JP); Riken, Wako-shi (JP)

( * ) Notice: Subject to any disclaimer, the term of this patent is extended or adjusted under 35 U.S.C. 154(b) by 136 days.

(21) Appl. No.: 10/901,988

(22) Filed: Jul. 30, 2004

(65) Prior Publication Data

US 2005/0086183 A1    Apr. 21, 2005

(30) Foreign Application Priority Data

Aug. 7, 2003   (JP)   ............................. 2003-289138

(51) Int. Cl.
*G06E 1/00* (2006.01)
(52) U.S. Cl. .............................. 706/30; 706/15; 706/26
(58) Field of Classification Search ...................... None
See application file for complete search history.

(56) References Cited

U.S. PATENT DOCUMENTS

| | | | |
|---|---|---|---|
| 5,649,065 A * | 7/1997 | Lo et al. ...................... | 706/22 |
| 5,699,441 A | 12/1997 | Sagawa et al. | |
| 5,835,633 A | 11/1998 | Fujisaki et al. | |
| 5,956,702 A * | 9/1999 | Matsuoka et al. ............. | 706/22 |
| 6,792,413 B2 * | 9/2004 | Tani .............................. | 706/30 |
| 2004/0036437 A1 | 2/2004 | Ito | |

FOREIGN PATENT DOCUMENTS

| | | |
|---|---|---|
| JP | 2002-086378 | 3/2002 |
| WO | WO 02/081157 | 10/2002 |

OTHER PUBLICATIONS

"Real Time Recurrent Neural Networks for Time Series Prediction and Confidence Estimation", Jenq-Neng Hwang; Little, E., Neural Networks, 1996., IEEE International Conference on Jun. 3-6, 1996, pp. 1889-1894 vol. 4.*
"Self-Organization of Modules and Their Hierarchy in Robot Learning Problems: A Dynamical systems Approach", Tani J., Nolfi S., (1997), Technical report SCSL-RL-97-008, Sony CSL, Tokio, J. http://citeseer.ist.psu.edu/article/tani97selforganization.html.*

(Continued)

*Primary Examiner*—David Vincent
*Assistant Examiner*—Mai T Tran
(74) *Attorney, Agent, or Firm*—Oblon, Spivak, McClelland, Maier & Neustadt, P.C.

(57) ABSTRACT

An information processing method and an information processing apparatus in which the learning efficiency may be improved and the scale may be extended readily. An integrated module 42 is formed by a movement pattern learning module by a local expression scheme. The local modules 43-1 to 43-3 of the integrated module 42 are each formed by a recurrent neural network as a movement pattern learning model by a distributed expression scheme. The local modules 43-1 to 43-3 are caused to learn plural movement patterns. Outputs from the local modules 43-1 to 43-3, supplied with preset parameters, as inputs, are multiplied by gates 44-1 to 44-3 with coefficients W1 to W3, respectively, and the resulting products are summed together and output.

7 Claims, 18 Drawing Sheets

OTHER PUBLICATIONS

Wesolkowski S, et al: "A Comparative Study of Combination Schemes for an Ensemble of Digit-Recognition Neural Networks" 1997 IEEE International Conference on Systems, Man and Cybernetics: Computational Cybernetics and Simulation, Orlando, FL. Oct. 12-15, 1997, IEEE International Conference on Systems, Man and Cybernetics, New York, IEEE, US. vol. vol. 4, Oct. 12, 1997 (Oct. 12, 1997), pp. 3534-3539, XP000788344 ISBN: 0-7803-4054-X.

* cited by examiner

INFORMATION PROCESSING APPARATUS AND METHOD, PROGRAM STORAGE MEDIUM AND PROGRAM

BACKGROUND OF THE INVENTION

1. Field of the Invention

This invention relates to a method and an apparatus for processing the information, a program storage medium, and to a program. More particularly, it relates to a method and an apparatus for processing the information, a program storage medium, and to a program, in which the learning efficiency may be improved and the scale may be extended readily.

2. Description of Related Art

Up to now, a neural network has been studied as one model pertinent to the brain of the human being or an animal. In the neural network, a preset movement pattern may be learned at the outset to check whether or not input data corresponds to the learned movement model.

As the models for recognizing the movement pattern, a movement pattern learning model by a local expression scheme and a movement pattern learning model by a distributed expression scheme are known.

With the movement pattern learning model by the local expression scheme, independent local modules 1-1 to 1-3 are interconnected via associated gates 2-1 to 2-3, as shown in FIG. 1. The local modules 1-1 to 1-3 learn independent movement patterns.

In the movement pattern learning model by the local expression scheme, the totality of the outputs is determined by controlling the gates 2-1 to 2-3.

This movement pattern learning model by the local expression scheme is disclosed in the Patent Publication 1.

On the other hand, in the movement pattern learning model by the distributed expression scheme, a module 21 learns plural movement patterns, as shown in FIG. 2.

[Patent Publication 1] Japanese Laid-Open Patent Publication H-11-126198

However, in the movement pattern learning model by the local expression scheme, the relationship among different patterns is not taken into account, and hence it is difficult to generalize the plural patterns for learning.

In the movement pattern learning model by the distributed expression scheme, plural movement patterns are learned by a sole module having only a small number of parameters, and hence the learning efficiency is low, whilst difficulties are met in connection with scale extensibility.

SUMMARY OF THE INVENTION

In view of these problems inherent in the prior art, it is an object of the present invention to provide an apparatus for processing the information, a program storage medium, and a program in which the learning efficiency may be improved and in which the scale may be extended readily.

In one aspect, the present invention provides an information processing apparatus for processing a time-series pattern, comprising a first movement pattern learning model by a distributed expression scheme for learning the time-series pattern, a second movement pattern learning model by a distributed expression scheme for learning the time-series pattern, and a third movement pattern learning model by a local expression scheme, having the first movement pattern learning model and the second movement pattern learning model as elements.

The first movement pattern learning model and the second movement pattern learning model may each be formed by a recurrent neural network provided with an operating parameter.

The first movement pattern learning model and the second movement pattern learning model each calculate a learning error, calculate a weighting coefficient of a correction amount of a learning parameter based on the learning error and correct the learning parameter based on the weighting coefficient.

In another aspect, the present invention provides an information processing method for an information processing apparatus for processing a time-series pattern comprising a step of learning a plurality of first time-series patterns by a first movement pattern learning model by a distributed expression scheme, a step of learning a plurality of second time-series patterns by a second movement pattern learning model by a distributed expression scheme, and a step of recognizing or generating a time-series pattern by a third movement pattern learning model by a local expression scheme, having the first movement pattern learning model and the second movement pattern learning model as elements.

The first movement pattern learning model and the second movement pattern learning model may each be formed by a recurrent neural network provided with an operating parameter.

The information processing method according to the present invention may further comprise a first calculating step of calculating a learning error of the first movement pattern learning model and a learning error of the second movement pattern learning model, a second calculating step of calculating weighting coefficients of correction values of the learning parameters of the first movement pattern learning model and the second movement pattern learning model based on the learning errors, and a correction step of correcting the learning parameters of the first movement pattern learning model and the second movement pattern learning model based on the weighting coefficients.

In a further aspect, the present invention provides a program storage medium having stored therein a program for an information processing apparatus configured for processing a time-series pattern, in which the program allows a computer to execute the processing including a step of learning a plurality of first time-series patterns by a first movement pattern learning model by a distributed expression scheme, a step of learning a plurality of second time-series patterns by a second movement pattern learning model by a distributed expression scheme, and a step of recognizing or generating a time-series pattern by a third movement pattern learning model by a local expression scheme, having the first movement pattern learning model and the second movement pattern learning model as elements.

The first movement pattern learning model and the second movement pattern learning model may each be formed by a recurrent neural network provided with an operating parameter.

The program for the storage medium according to the present invention may further comprise a first calculating step of calculating a learning error of the first movement pattern learning model and a learning error of the second movement pattern learning model, a second calculating step of calculating weighting coefficients of correction values of the learning parameters of the first movement pattern learning model and the second movement pattern learning model based on the learning errors, and a correction step of correcting the learning parameters of the first movement pattern learning model and the second movement pattern learning model based on the weighting coefficients.

In yet another aspect, the present invention provides a program for a computer controlling an information processing apparatus configured for processing a time-series pattern, in which the program allows a computer to execute the processing including a step of learning a plurality of first time-series patterns by a first movement pattern learning model by a distributed expression scheme, a step of learning a plurality of second time-series patterns by a second movement pattern learning model by a distributed expression scheme, and a step of recognizing or generating a time-series pattern by a third movement pattern learning model by a local expression scheme, the third movement pattern learning model having the first movement pattern learning model and the second movement pattern learning model as elements.

The first movement pattern learning model and the second movement pattern learning model may each be formed by a recurrent neural network provided with an operating parameter.

The program according to the present invention may further comprise a first calculating step of calculating a learning error of the first movement pattern learning model and a learning error of the second movement pattern learning model, a second calculating step of calculating weighting coefficients of correction values of the learning parameters of the first movement pattern learning model and the second movement pattern learning model based on the learning errors, and a correction step of correcting the learning parameters of the first movement pattern learning model and the second movement pattern learning model based on the weighting coefficients.

According to the present invention, the first and second movement pattern learning models are each a model by a distributed expression scheme, and the third movement pattern learning model by the local expression scheme is formed by the first and second movement pattern learning models.

According to the present invention, the movement pattern can be learned. In particular, it is possible to improve the learning efficiency and to extend the scale extremely readily.

The best mode for carrying out the invention is hereinafter explained. However, the relationship of correspondence between the various aspects of the invention, disclosed in the specification, and the embodiments, is first explained. Should there be an embodiment(s), disclosed in the specification, but not stated as corresponding to the aspects of the invention, such embodiment(s) is not thereby considered to be not corresponding to the aspects of the invention. Conversely, should there be an embodiment(s) stated herein to be corresponding to a certain aspect of the invention, such embodiment(s) is not thereby considered to be not corresponding to an aspect(s) other than the so stated aspect of the invention.

In addition, the disclosure is not meant to indicate that the totality of the aspects of the invention corresponding to the embodiments stated in the specification is herein disclosed. In other words, the disclosure is to be interpreted as encompassing the aspects of the invention that may be presented or added in future by divisional application or amendments.

DESCRIPTION OF THE PREFERRED EMBODIMENTS

Figure 1:
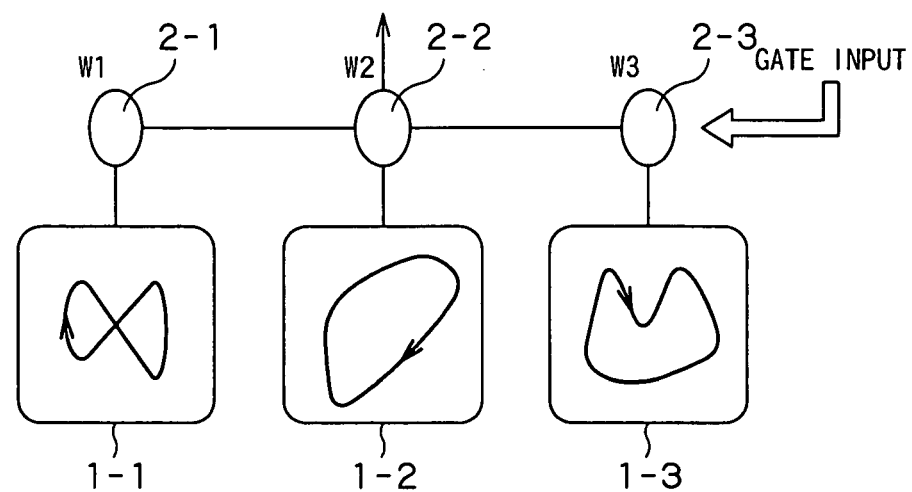
FIG. 1 shows an example of a movement pattern learning model by a conventional local expression scheme.
Figure 2:
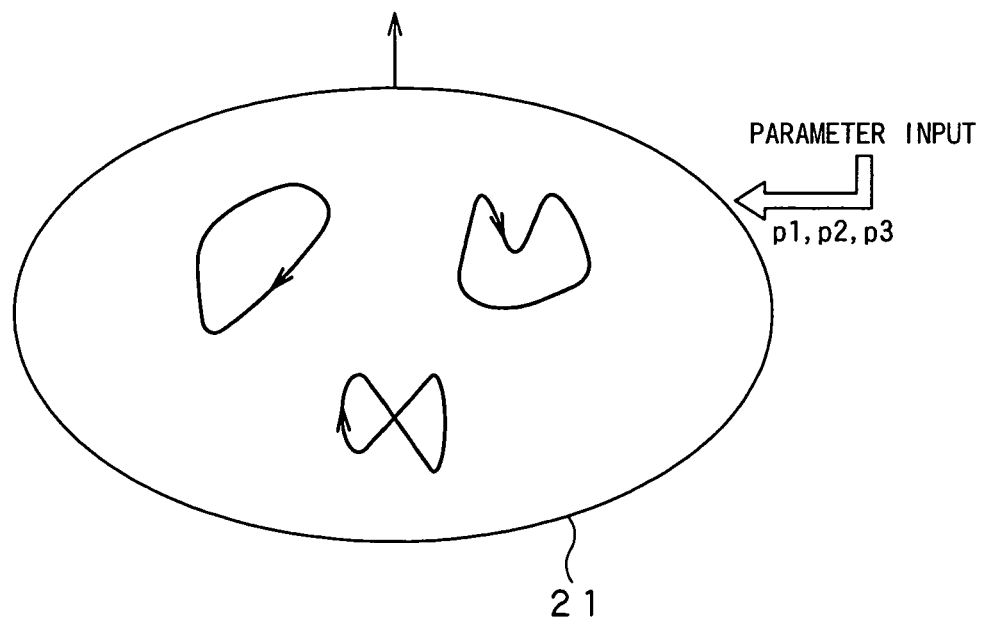
FIG. 2 shows an example of a movement pattern learning model by a conventional distributed expression scheme.

Referring now to the drawings, certain preferred embodiments of the present invention are explained in detail.

Figure 3:
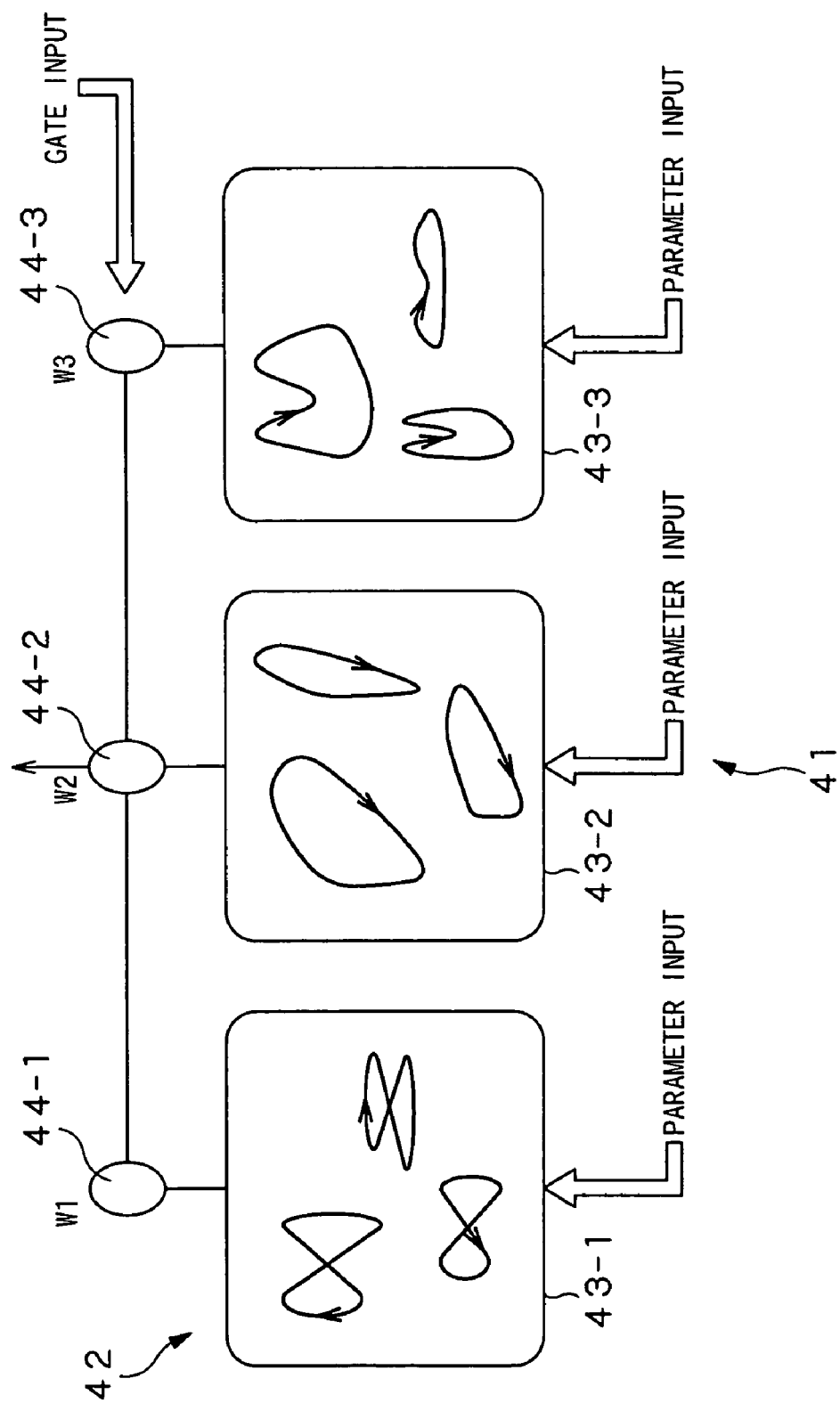
FIG. 3 is a block diagram showing an illustrative structure of a processing apparatus embodying the present invention.

The present invention provides an information processing apparatus for processing a time-series pattern, for example, a processing apparatus 41 shown in FIG. 3. This information processing apparatus includes a first movement pattern learning model by a distributed expression scheme, for learning the time-series pattern (such as, for example, a local module 43-1 of FIG. 3), a second movement pattern learning model by a distributed expression scheme, for learning the time-series pattern (such as, for example, a local module 43-2 of FIG. 3), and a third movement pattern learning model by the local expression scheme, having the first movement pattern learning model and the second movement pattern learning model, as elements (such as, for example, an integrated module 42 of FIG. 3).

Figure 5:
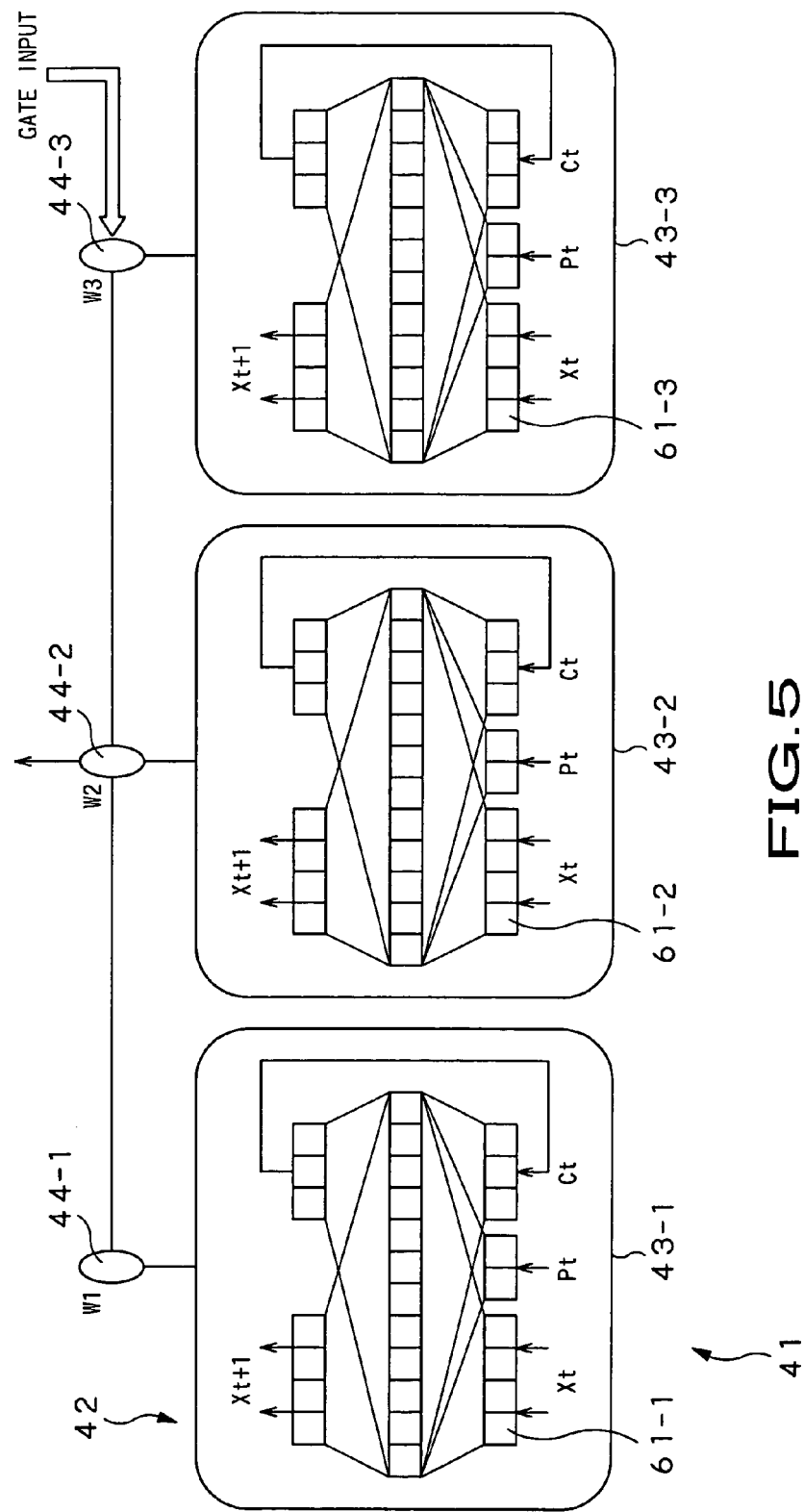
FIG. 5 is a block diagram showing another illustrative structure of a processing apparatus embodying the present invention.

The first and second movement pattern learning models of this information processing apparatus may each be constructed by recurrent type neural networks each having operating parameters (such as RNN 61-1 and 61-2 of FIG. 5).

Figure 25:
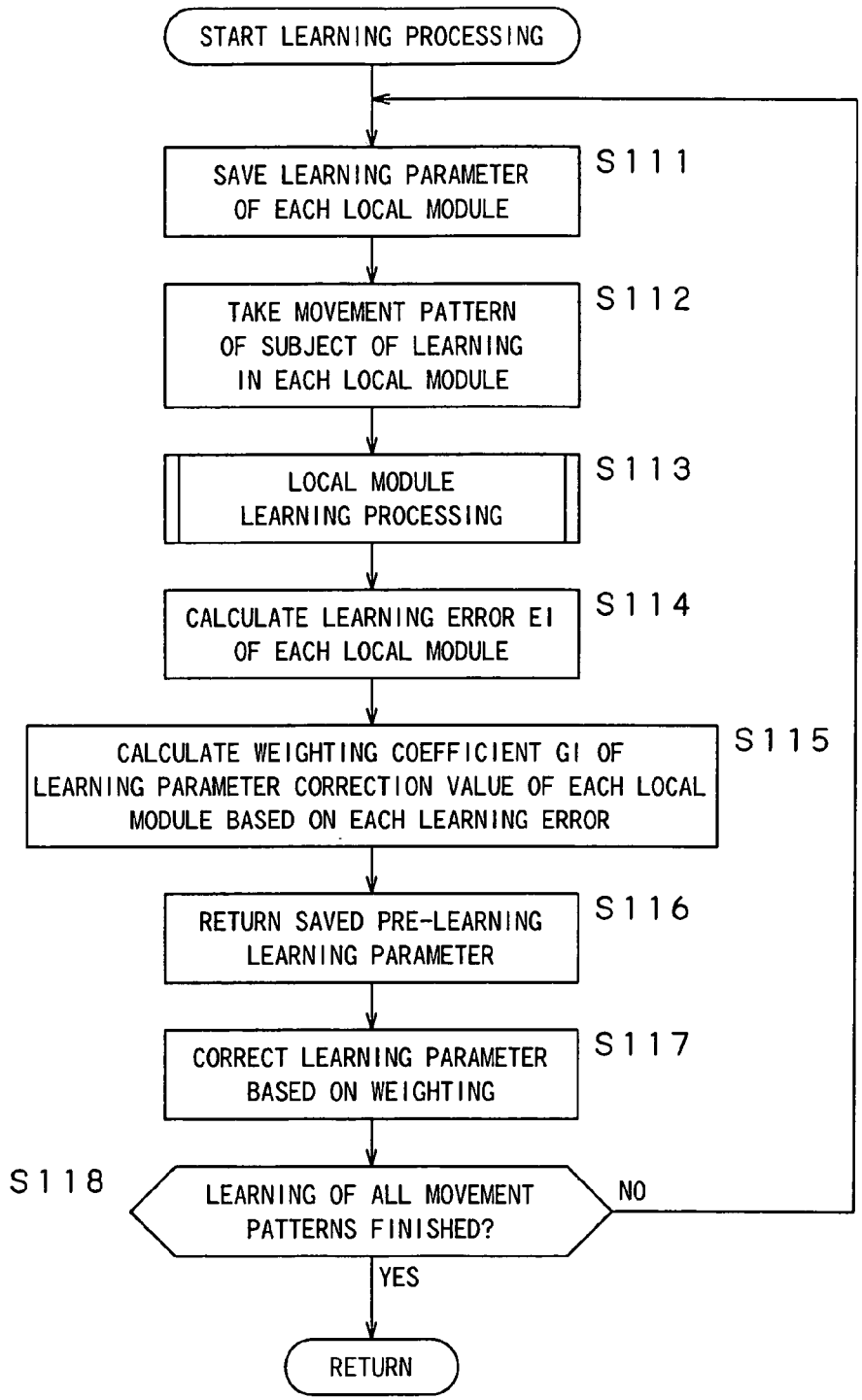
FIG. 25 is a flowchart for illustrating another example of learning processing in a step S2 of FIG. 4.

Moreover, the first and second movement pattern learning models of this information processing apparatus may each be able to calculate a learning error (such as a learning error $e_i$ of the equation (5)) (by, for example, the processing of a step S114 of FIG. 5), to calculate a weighting coefficient of a correction value of the learning parameter $\Delta w'_i$ of the equation (7), such as a weighting coefficient gi of the equation (6), based on the learning error (for example, the processing of step S115 of FIG. 25), and to correct the learning parameter based on the weighting coefficient (for example, the processing of step S117 of FIG. 25).

The present invention also provides an information processing apparatus (for example, a processing apparatus 41 of FIG. 3). This method includes a step of learning a plurality of first time-series patterns by a first movement pattern learning model (for example, a local module 43-1 of FIG. 3) by a distributed expression scheme (for example, a step S13 of FIG. 7 in case of learning the local module 43-1 of FIG. 3), a step of learning a plurality of second time-series patterns by a second movement pattern learning model (for example, a local module 43-2 of FIG. 3) by a distributed expression scheme (for example, a step S13 of FIG. 7 in case of learning the local module 43-2 of FIG. 3), and a step of recognizing or generating a time-series pattern by a third movement pattern learning model by a local expression scheme, having the first movement pattern learning model and the second movement pattern learning model as elements (for example, a step S3 of FIG. 4).

The first movement pattern learning model and the second movement pattern learning model of the information processing method may each be formed by a recurrent neural network provided with an operating parameter.

Figure 7:
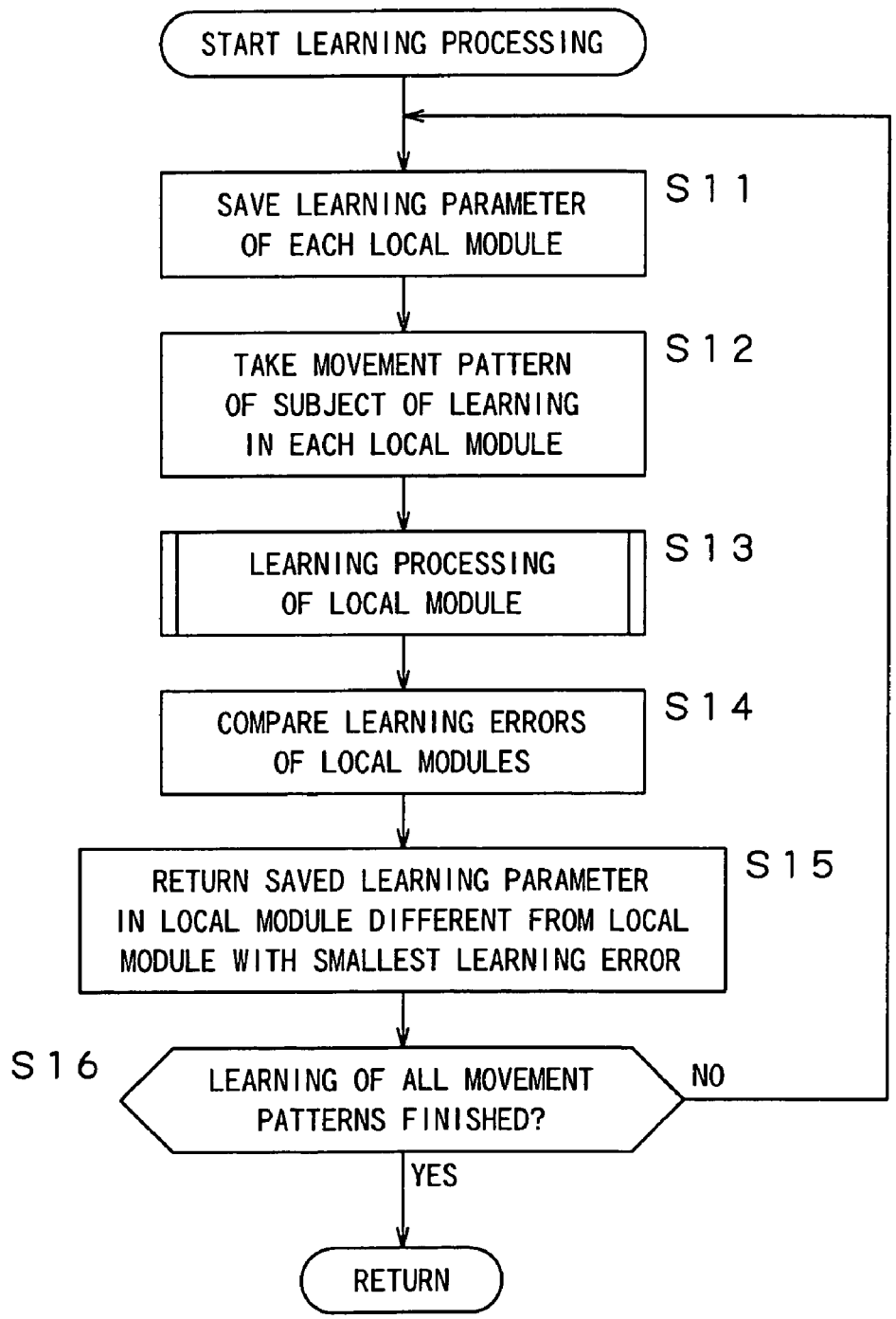
FIG. 7 is a flowchart for illustrating the learning processing in a step S2 of FIG. 4.

The information processing method may further include a first calculating step (such as the processing of a step S114 of FIG. 25) of calculating a learning error (learning error ei of the equation (5)) of the first movement pattern learning model and the second movement pattern learning model, a second calculating step (such as the processing of a step S115 of FIG. 25) of calculating the correction value of the learning parameter of the first movement pattern learning model and the second movement pattern learning model (such as the weighting coefficient of the correction values of the learning parameters ($\Delta w'i$) of FIG. 7) (such as the weighting coefficient gi of the equation (6)), based on the learning error, and a correction step (such as the processing of the step S117 of FIG. 25) of correcting the learning parameters of the first movement pattern learning model and the second movement pattern learning model based on the weighting coefficients.

The present invention also provides a program storage medium (such as an optical disc 172) having stored therein a program for processing a time-series pattern. The program includes a step (such as a step S13 of FIG. 7 in case of learning the local module 43-1 of FIG. 3) of learning a plurality of first time-series patterns by a first movement pattern learning model by a distributed expression scheme (such as local module 43-1 of FIG. 3), a step (such as a step S13 of FIG. 7 in case of learning the local module 43-2 of FIG. 3) of learning a plurality of second time-series patterns by a second movement pattern learning model by a distributed expression scheme (such as local module 43-2 of FIG. 3), and a step (such as step S3 of FIG. 4) of recognizing or generating a time-series pattern by a third movement pattern learning model by a local expression scheme. The third movement pattern learning model has the first movement pattern learning model and the second movement pattern learning model as elements.

The first movement pattern learning model and the second movement pattern learning model in the program of the program storage medium may each be formed by a recurrent neural network provided with an operating parameter.

The program may further include a first calculating step (such as processing of the step S114 of FIG. 25) of calculating a learning error (such as a learning error ei of the equation (5)) of the first movement pattern learning model and the second movement pattern learning model, a second calculating step (such as processing of the step S115 of FIG. 25) of calculating the correction value of the learning parameter of the first movement pattern learning model and the second movement pattern learning model (such as the weighting coefficient of the correction values of the learning parameters ($\Delta w'i$) of FIG. 7) (such as the weighting coefficient gi of the equation (6)), based on the learning error, and a correction step (such as the processing of the step S117 of FIG. 25) of correcting the learning parameters of the first movement pattern learning model and the second movement pattern learning model based on the weighting coefficients.

The present invention also provides a program for processing a time-series pattern. The program includes a step (such as a step S13 of FIG. 7 in case of learning the local module 43-1 of FIG. 3) of learning a plurality of first time-series patterns by a first movement pattern learning model by a distributed expression scheme (such as local module 43-1 of FIG. 3), a step (such as a step S13 of FIG. 7 in case of learning the local module 43-2 of FIG. 3) of learning a plurality of second time-series patterns by a second movement pattern learning model by a distributed expression scheme (such as local module 43-2 of FIG. 3), and a step (such as step S3 of FIG. 4) of recognizing or generating a time-series pattern by a third movement pattern learning model by a local expression scheme. The third movement pattern learning model has the first movement pattern learning model and the second movement pattern learning model as elements.

The first movement pattern learning model and the second movement pattern learning model in the program may each be formed by a recurrent neural network provided with an operating parameter.

The program may further include a first calculating step (such as processing of the step S114 of FIG. 25) of calculating a learning error (such as a learning error ei of the equation (6)), of the first movement pattern learning model and the second movement pattern learning model in the program, a second calculating step (such as processing of the step S115 of FIG. 25) of calculating the correction value of the learning parameter of the first movement pattern learning model and the second movement pattern learning model (such as the weighting coefficient of the correction values of the learning parameters ($\Delta w'i$) of FIG. 7) (such as the weighting coefficient gi of the equation (6)), based on the learning error, and a correction step (such as the processing of the step S117 of FIG. 25) of correcting the learning parameters of the first movement pattern learning model and the second movement pattern learning model based on the weighting coefficients.

An embodiment of the present invention is hereinafter explained.

FIG. 3 shows an illustrative structure of a processing apparatus 41 embodying the present invention. This processing apparatus 41 is formed by the integrated module 42 which is the movement pattern learning model by the local expression scheme. The integrated module 42 is formed by plural (herein three) local modules 43-1 to 43-3 and associated gates 44-1 to 44-3. For the gates 44-1 to 44-3, coefficients W1 to W3 are set, respectively. An output of the gates is expressed by the following equation:

Total output=$\Sigma Wi \times$modulei $(pi)$

In the above equation, the value of i is 1, 2, or 3 and represents one of the local modules 43-1 to 43-3. On the other hand, modulei (pi) denotes outputs of the local modules 43-1 to 43-3 in case the value of the parameters is pi.

Figure 4:
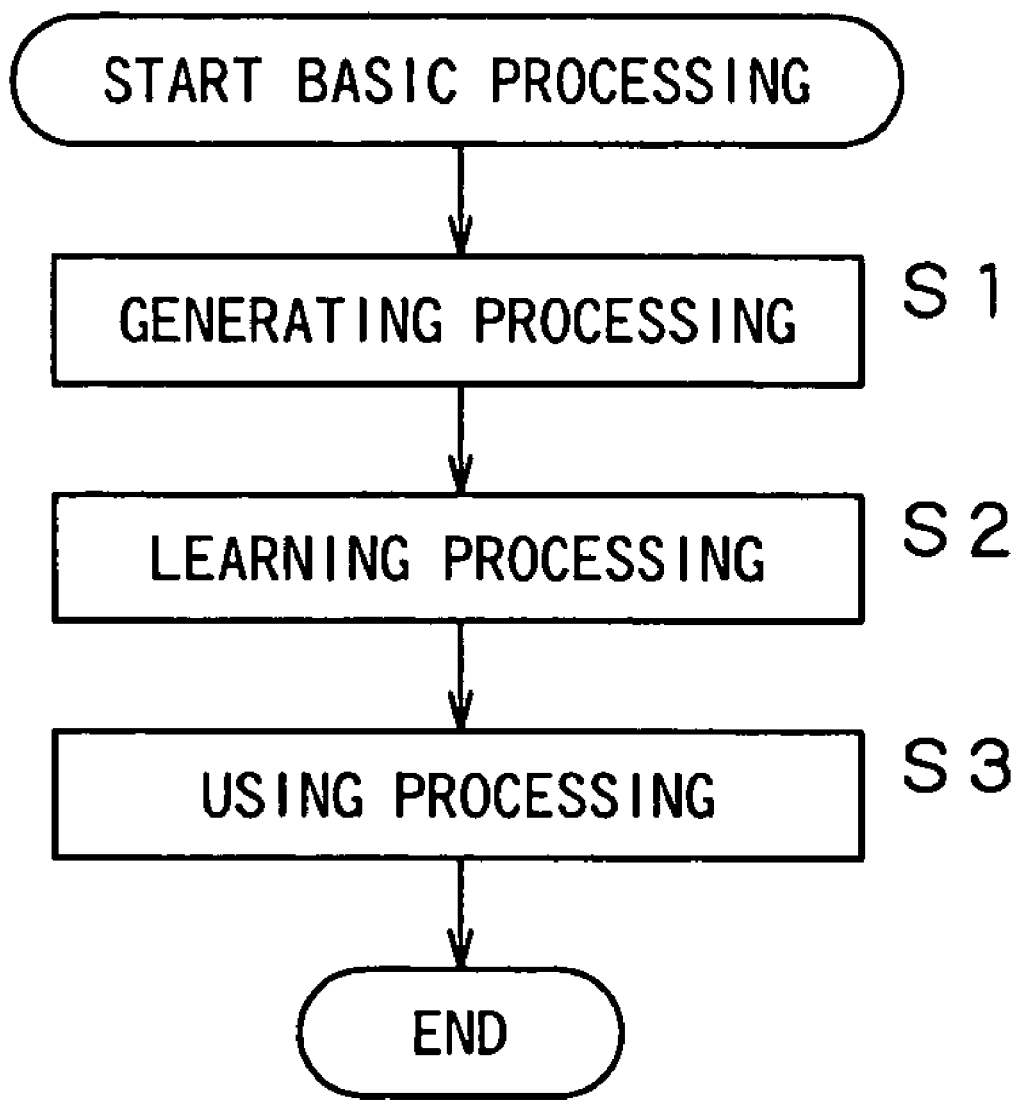
FIG. 4 is a flowchart for illustrating the basic processing of the processing apparatus shown in FIG. 3.

Referring to the flowchart of FIG. 4, the basic processing of the processing apparatus 41 of FIG. 3 is explained.

In a step S1, the processing of generating the integrated module 42 by the local modules 43-1 to 43-3 is executed. The outputs of the local modules 43-1 to 43-3 generated are multiplied with the coefficients W1 to W3 in the gates 44-1 to 44-3, respectively, and subsequently synthesized together, and a so synthesized output is sent out.

Next, in the step S2, the learning processing is carried out. By this learning processing, plural movement patterns (time-series patterns) are learned and stored in the respective local modules 43-1 to 43-3.

The learning processing of the step S2 will be explained in detail subsequently by referring to the flowchart of FIG. 7.

After the movement patterns are learned as described above, the processing of utilizing the processing apparatus 41, such as inputting the needed parameters to the respective local modules 43-1 to 43-3 to cause the corresponding patterns to be output, or inputting preset movement patterns to the respective local modules 43-1 to 43-3 to cause the corresponding coefficients to be output, are executed.

Figure 21:
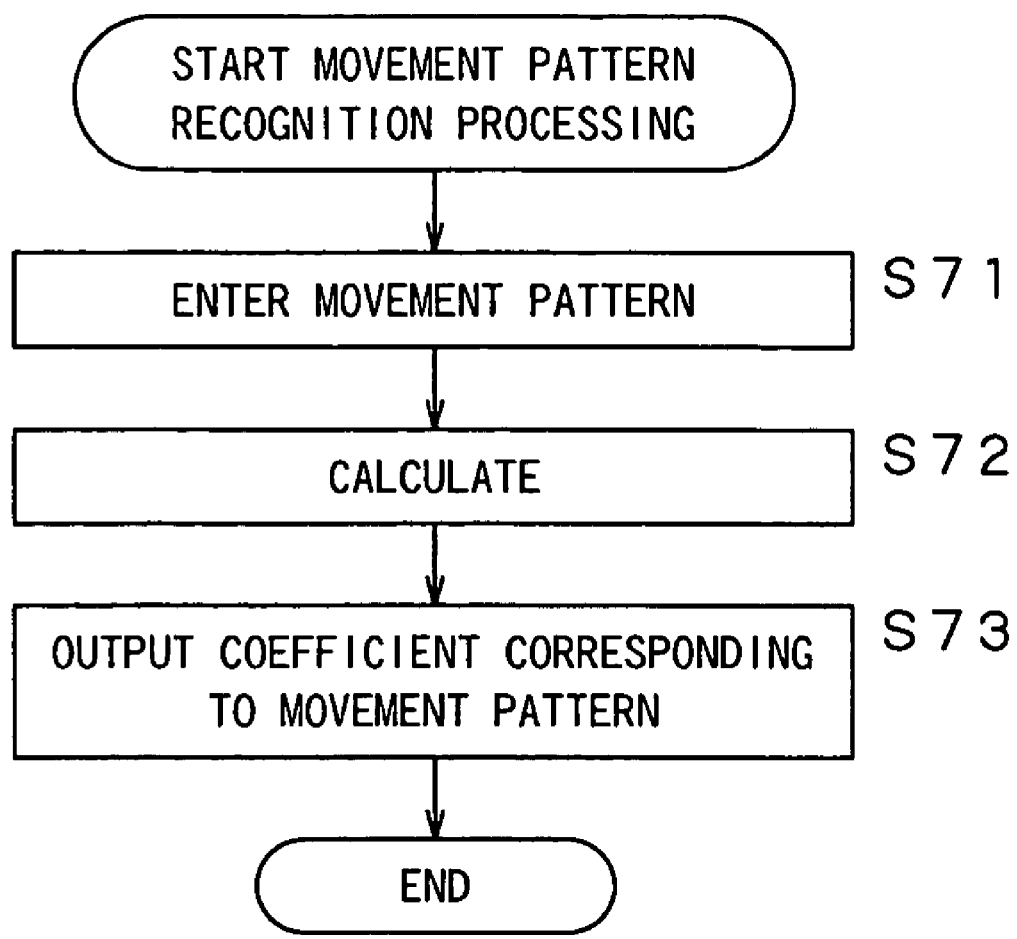
FIG. 21 is a flowchart for illustrating the movement pattern recognition processing.

The utilization processing of the step S3 will be explained in detail subsequently by referring to FIGS. 21 and 23.

The processing of the steps S1 to S3 is carried out in this order. However, these steps are not necessarily carried out in succession, such that preset time intervals may be provided between the steps S1 and S2 or between the steps S2 and S3.

In the present embodiment, the local modules 43-1 to 43-3 are formed by recurrent neural networks (RNN) 61-1 to 61-3, each having the function of learning the movement pattern, as shown in FIG. 5. In the following explanation, if there is no necessity of individually demarcating the local modules 43-1 to 43-3 or the RNNS 61-1 to 61-3, these are simply referred to as a local module 43 or RNN 61, respectively.

Figure 6:
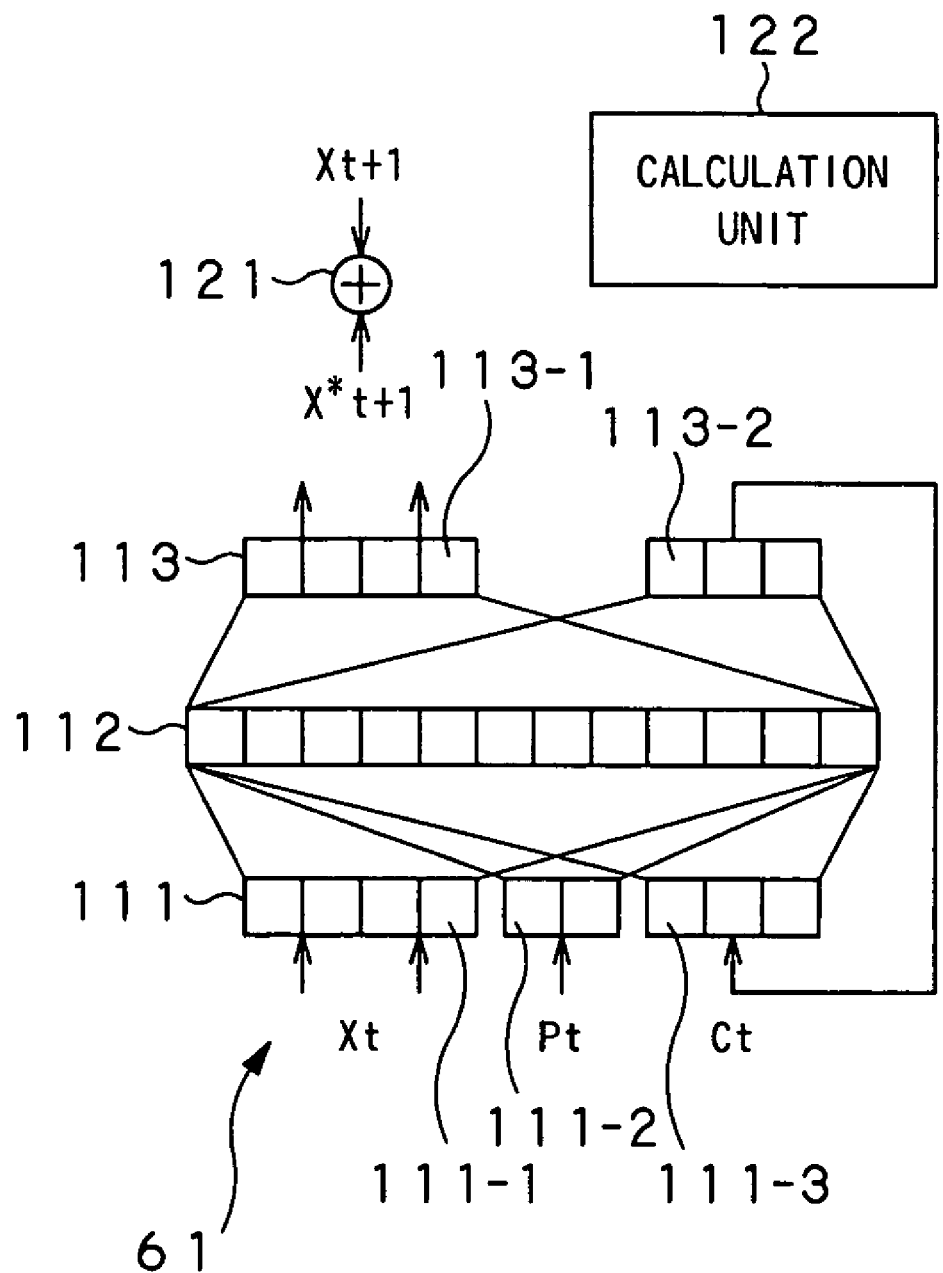
FIG. 6 shows an illustrative structure of a of a recurrent type neural network.

FIG. 6 shows an illustrative structure of the RNN 61. This RNN 61 is made up by an input layer 111, an intermediate layer (hidden layer) 112 and an output layer 113. The input layer 111, intermediate layer 112 and the output layer 113 are each made up by an optional number of neurons.

A neuron 111-1, as a part of the input layer 111, is supplied with data xt pertinent to a time-series pattern. Specifically, data pertinent to the a movement pattern of the human body, obtained on picture processing, based on e.g. a camera image (for example, a movement trajectory of a hand's tip), is supplied.

A parametric bias node 111-2, as a neuron of a part of the input layer 111, is supplied with a parameter Pt. The number of the parametric bias nodes is one or more. The number of the nodes is preferably sufficiently small as compared to the total number of the neurons making up the recurrent neural network, which number determine the number of weight matrices, as parameters of model determining means. In the present embodiment, the total number of the neurons is 50, whilst the number of the parametric bias nodes is on the order of 1 or 2. It is noted that these numbers are merely illustrative and are not limiting the invention.

The parametric bias nodes modulate the mechanical structure in the non-linear mechanical system and, in the present embodiment, modulate the mechanical structure held by the recurrent neural network. However, the present invention is not limited to the recurrent neural network.

To a neuron 111-3, forming a part of the input layer 111, data output from a neuron 113-2 of the output layer 113, is fed back as a context Ct representing the inner state of the RNN 61. The context Ct is a routine term pertinent to the recurrent neural network and is elucidated in, for example, the Reference material (Elman, J. L. (1990). Finding Structure in Time, Cognitive Science, 14. 170-211).

The neurons of the intermediate layer 112 perform weighted summation of input data to output resultant data sequentially to a downstream side stage. That is, the neurons of the intermediate layer process the data xt, Pt and Ct with calculation processing for preset weighting coefficients (calculation processing based on non-linear functions) to output the result to the output layer 113. In the present embodiment, an input corresponding to the preset weighted sum of the data xt, Pt and Ct is processed with calculations which are based on a function having non-linear output characteristics, such as sigmoid function, to output the result to the output layer 113.

A neuron 113-1, forming a part of the output layer 113, outputs data x*t+1 associated with input data.

The RNN 61 includes a calculation unit 121 for learning by back propagation. A calculation unit 122 sets weighting coefficients for the RNN 61.

Referring to the flowchart of FIG. 7, the learning processing in the step S2 of FIG. 4 is explained.

In a step S11, the processing for saving learning parameters (weighting coefficients of the respective neurons) of the local modules 61-1 to 61-3 in the calculation unit 122 is carried out. In the next step S12, the processing of taking the movement patterns of the subject of learning in each of the local modules 61-1 to 61-3 is carried out. In the next step S13, the learning processing of the local modules is carried out. The learning processing of the local modules will be explained in detail later by referring to the flowchart of FIG. 18. By the processing of this step S13, a movement pattern is learned by one of the local modules 61-1 to 61-3, for example, the local module 61-1.

In the next step S14, the calculation unit 122 acquires the learning errors of the local modules 61-1 to 61-3 to compare the error values to one another. In this manner, the calculation unit 122 decides on the local module having the smallest value of the learning error.

In the next step S15, the calculation unit 122 performs the processing of returning the learning parameter (weighting coefficient), saved in the processing of the step S11, to the local module other than the local module with the smallest learning error. For example, if the local module with the smallest learning error is the local module 61-1, the learning parameters of the local modules 61-2 and 61-3 are restored to the pre-earning states.

In the next step S16, the calculation unit 122 determines whether or not the learning of the totality of the movement patterns has come to a close. If the totality of the movement patterns has not come to a close, the calculation unit 122 returns to the step S11 to execute the processing as from this step repeatedly.

If it is determined in the step S16 that the learning of the totality of the movement patterns has come to a close, the learning processing comes to a close.

Figure 12:
Figure 13:
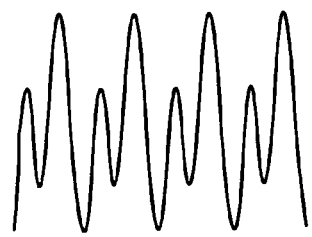
Figure 14:
Figure 15:
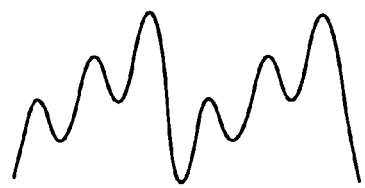
Figure 16:
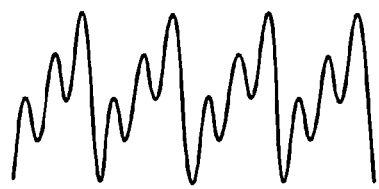
Figure 17:
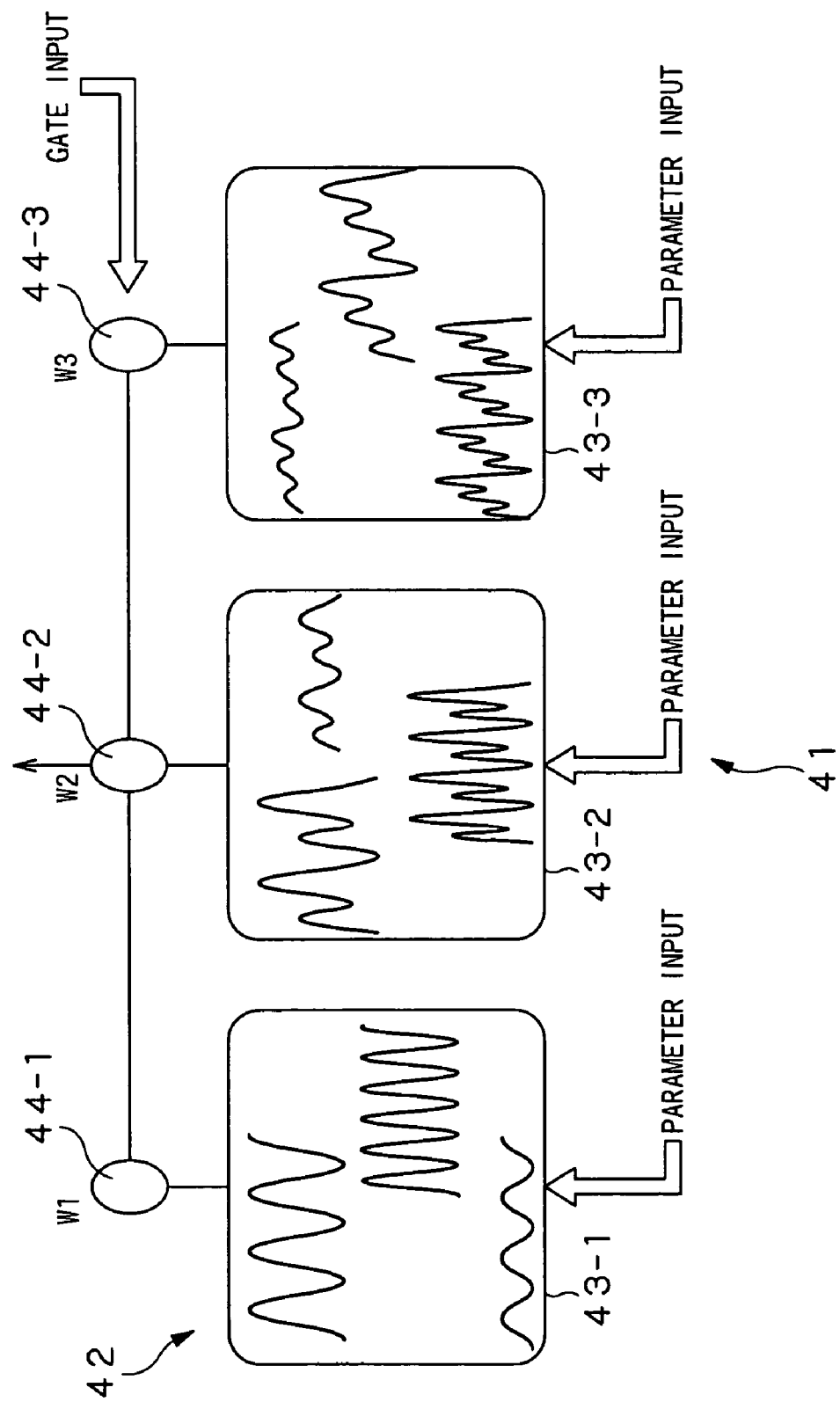
FIG. 17 shows the state of having the movement pattern learned by the processing apparatus of FIG. 5.

In this manner, the sum total of 9 sorts of the movement patterns, shown in FIGS. 8 to 16, is learned one by one by the local modules 43-1 to 43-3. In the present case, the movement patterns shown in FIGS. 8 to 10, the movement patterns shown in FIGS. 11 to 13 and the movement patterns shown in FIGS. 14 to 16, are learned by the local modules 43-1, 43-2 and 43-3, respectively, as shown in FIG. 17. In the gates 44-1 to 44-3, the coefficients W1 to W3 of preset values are set from a device, not shown.

In each of the local modules 43-1 to 43-3, movement patterns having a co-ownable mechanical structure are learned. This will be explained later by referring to FIG. 20.

Figure 18:
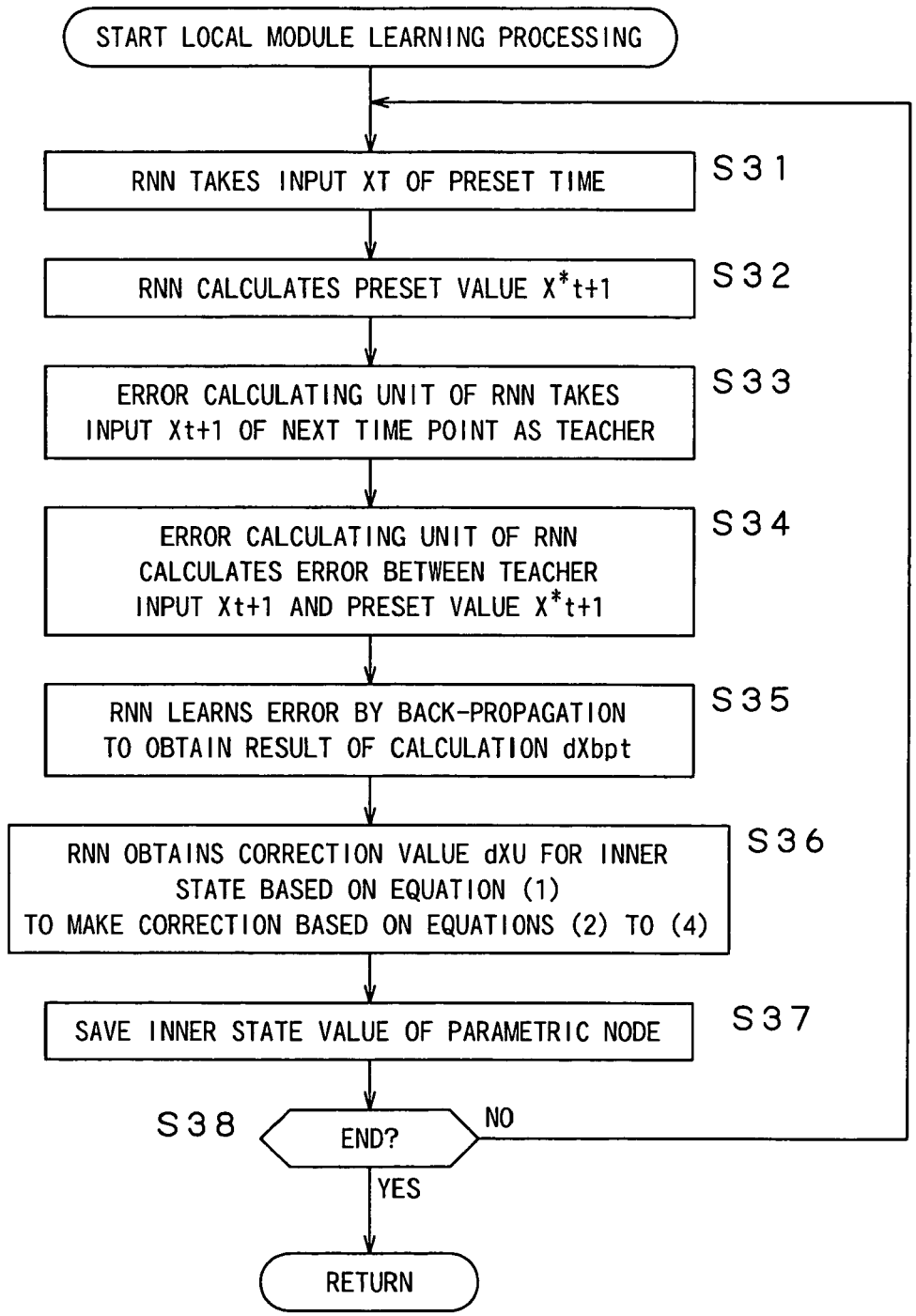
FIG. 18 is a flowchart for illustrating the local module learning processing in a step S13 of FIG. 7.

Referring to the flowchart of FIG. 18, the local module learning processing in the step S13 of FIG. 7 is now explained.

The processing shown in the flowchart of FIG. 18 is carried out from one movement pattern to be learned to the next. In other words, a number of imaginary RNNs corresponding to the number of the movement patterns to be learned are provided and the processing of FIG. 18 is carried out from one imaginary RNN to the next.

After the processing shown in the flowchart of FIG. 18 is carried out from one imaginary RNN to the next and the learning pattern is learned from one imaginary RNN to the next, the processing of setting a coefficient for the practical RNN 61 is carried out. However, in the following explanation, the imaginary RNN is explained as being the actual RNN 61.

First, in a step S31, the neuron 111-1 of the input layer 111 of the RNN 61 takes in an input xt at a preset time t. In a step S32, the intermediate layer 112 of the RNN 61 performs calculation processing for weighting coefficients for the input xt, and outputs, from the neuron 113-1 of the output layer 113, a predicted value x*t+1 of the value t+1 of the time series in the input time-series pattern.

In a step S33, the calculation unit 121 takes an input xt+1 of the next time point t+1 as teacher data. In a step S32, the calculation unit 121 calculates, in a step S34, an error between the teacher input xt+1, taken by the processing of a step S33, and the predicted value x*t+1, obtained on calculations in the processing of the step S32.

In a step S35, the RNN 61 is supplied from the neuron 113-1 of the output layer 113 with an error obtained on calculations by the processing of the step S34, and back-propagates the input error to the intermediate layer 112 and thence to the input layer 111 to carry out the learning processing to obtain the calculated result dXpt.

In a step S36, the intermediate layer 112 acquires a correction value dXU of the inner state based on the following equation (1):

$$dXU_t = k_{bp} \cdot \sum_{t-\frac{1}{2}}^{t+\frac{1}{2}} dX_{bpt} + k_{nb} \cdot (XU_{t+1} - XU_t + XU_{t-1} - XU_t) \quad (1)$$

The intermediate layer 112 then corrects the correction value dXU based on the following equations (2) to (4):

$$dlXU_t = \epsilon \cdot dXU_t + \text{monentum} \cdot dlXU_t \quad (2)$$

$$XU_t = XU_t + dlXU_t \quad (3)$$

$$X_t = \text{sigmoid}(XU_t) \quad (4)$$

In a step S37, a parametric node 111-2 executes the processing of saving the value of the inner state thereof.

In the next step S38, the RNN 61 checks to see whether or not the learning processing is to come to a close. If the learning processing has not come to a close, the parametric node returns to the step S31 to carry out the processing as from this step repeatedly.

If it is determined in the step S38 that the learning processing is to come to a close, the learning processing is terminated.

By executing the above learning processing, a learning pattern is learned for the imaginary RNN.

Figure 19:
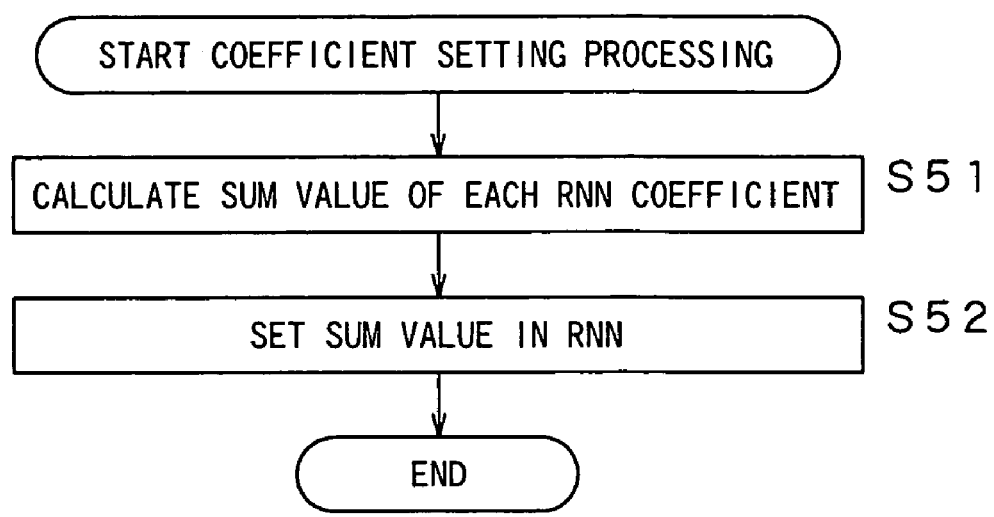
FIG. 19 is a flowchart for illustrating the coefficient setting processing.

After executing the learning processing for a number of the imaginary RNNs corresponding to the number of the learning patterns, as described above, the processing of setting the weighting coefficients, obtained by the learning processing, on the practical RNN 61, is carried out. FIG. 19 shows the processing in this case.

The calculation unit 122 in a step S51 calculates a synthesized value of the coefficients, obtained by executing the processing shown in the flowchart of FIG. 18 for each imaginary RNN. As this synthesized value, an average value, for example, may be used. That is, an average value of the weighting coefficients of the imaginary RNNs is here calculated.

In the next step S52, the calculation unit 122 executes the processing of setting the synthesized value (average value), calculated by the processing of the step S51, as a weighting coefficient for the neuron of the practical RNN 61.

This sets the coefficients, obtained on learning plural movement patterns, on the respective neurons of the intermediate layer 112 of the practical RNN 61.

The information pertinent to the co-ownable mechanical structure in generating plural teacher movement patterns is held in the weighting coefficients of the respective neurons of the intermediate layer 112, whilst the information needed for switching the co-ownable mechanical structure to the mechanical structure suitable for generating the respective teacher movement patterns is held in the parametric bias node.

In FIGS. 8 to 10, 11 to 13 and 14 to 16, the mechanical structures having different amplitudes and frequencies and substantially similar waveforms are taken to be the 'co-ownable mechanical structures'.

Figure 20:
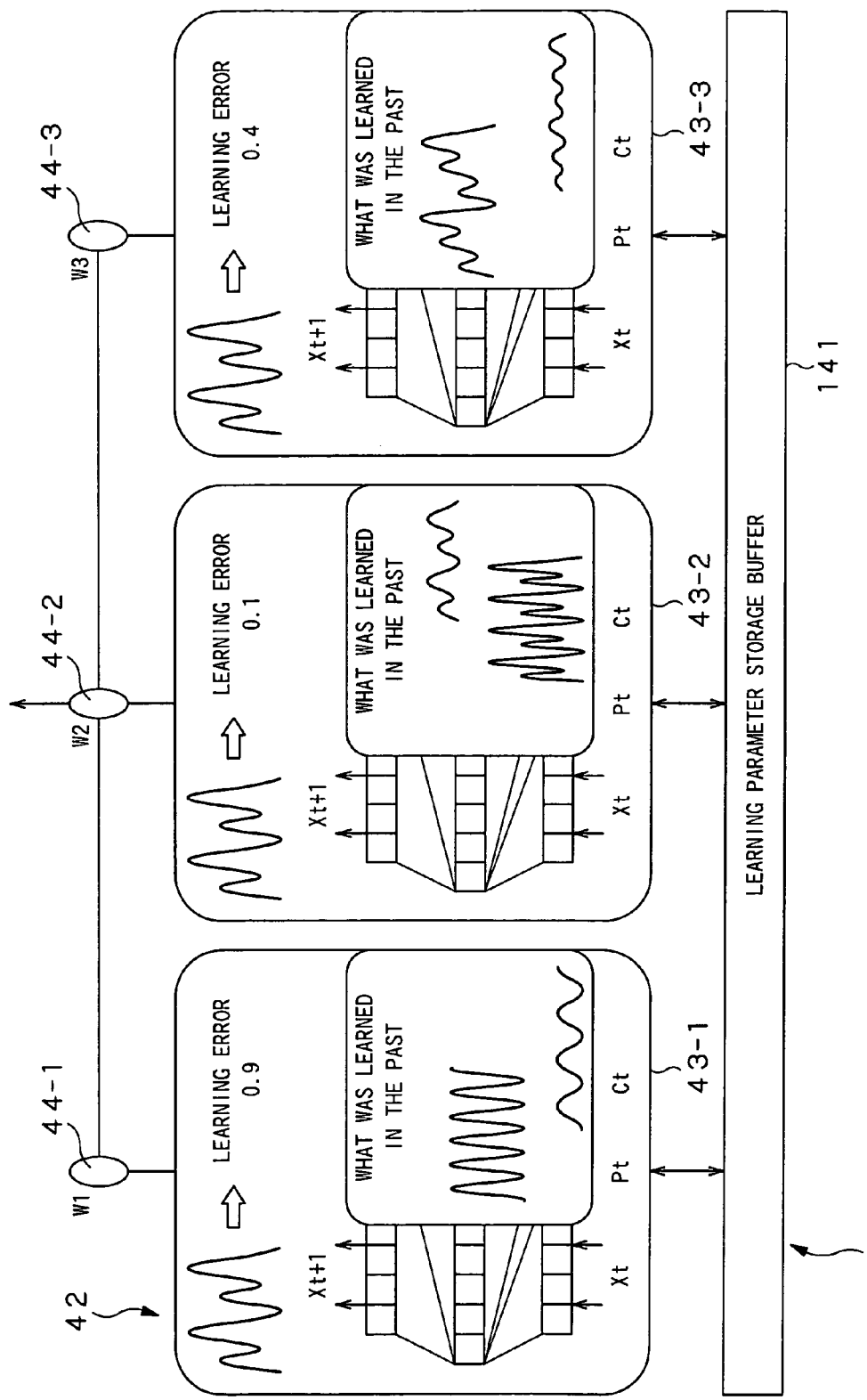
FIG. 20 illustrates the learning error in case of having the movement pattern learned by the processing apparatus of FIG. 5.

FIG. 20 shows the intermediate state in which the movement patterns are being learned by the local modules 43-1 to 43-3. In the state shown in FIG. 20, the movement patterns, shown in FIGS. 9 and 10, have already been learned in the local module 43-1, the movement patterns, shown in FIGS. 12 and 13, have already been learned in the local module 43-2 and the movement patterns, shown in FIGS. 14 and 15, have already been learned in the local module 43-3. FIG. 20 shows the state in which the movement pattern shown in FIG. 11 has further been learned.

The learning error of the local module 43-1 is 0.9, the learning error of the local module 43-2 is 0.1 and the learning error of the local module 43-3 is 0.4. Thus, it is the local module 43-3 that has the smallest learning error.

Figure 11:
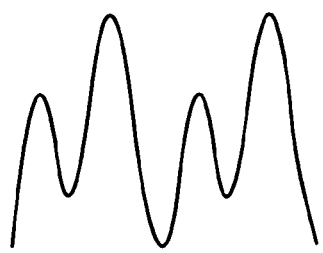

This means that it is the local module 43-2, among the local modules 43-1 to 43-3, that has learned the movement pattern analogous with the learning pattern shown in FIG. 11, that is, the movement pattern shown in FIGS. 12 and 13. Stated differently, the movement patterns, shown in FIGS. 11 to 13, are provided with co-ownable mechanical structures.

In this case, it is determined in the step S14 of FIG. 7 that the learning error of the local module 43-2 is the smallest, so that, in the step S15, the learning parameters, saved in the processing of the step S11, are returned to the local modules 43-1 and 43-3 in a learning parameter storage buffer 141 which forms the calculation unit 122. This prevents the learning parameters of the local modules 43-1 and 43-3 from being substantially destroyed by learning the movement patterns not having the 'co-ownable mechanical structure'.

Referring to the flowchart of FIG. 21, an example of the using processing, executed in the step S3 of FIG. 4 after the learning, is hereinafter explained.

Figure 8:
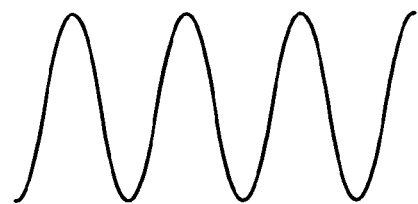
FIGS. 8 to 16 show different examples of a movement pattern.
Figure 9:
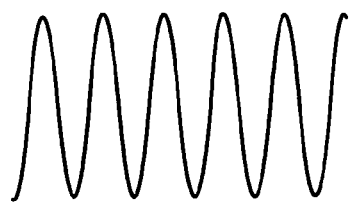
Figure 10:
Figure 22:
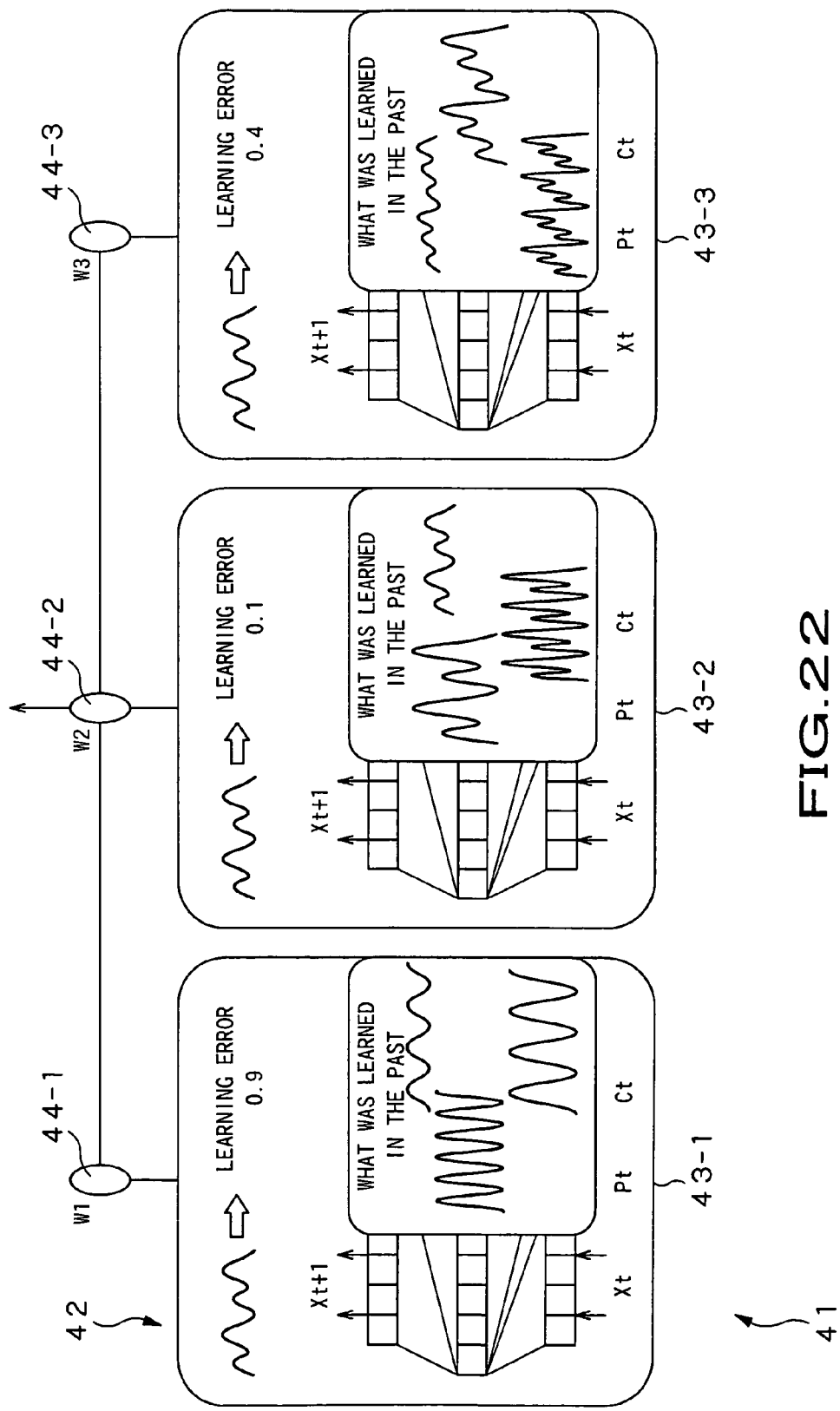
FIG. 22 illustrates the movement pattern recognition processing.

The movement patterns, shown in FIGS. 8 to 10, have already been learned in the local module 43-1, the movement patterns, shown in FIGS. 11 to 13, have already been learned in the local module 43-2 and the movement patterns, shown in FIGS. 14 to 16, have already been learned in the local module 43-3, as shown in FIG. 22.

If, in this state, the movement pattern, shown in FIG. 11, is entered in a step S71, as shown in FIG. 11, the respective local modules 43-1 to 43-3 in a step S72 perform calculations on data of the movement pattern entered to the node 111-1. In the present case, the recognition error in the local module 43-1 is 0.9, that in the local module 43-2 is 0.1 and that in the local module 43-3 is 0.4. Since the local module 43-2 has learned and memorized the movement pattern, shown in FIG. 11, the recognition error is smaller than that in the other local modules.

In the step S73, the local modules 43-1 to 43-3 output the results of calculations for the movement patterns to the gates 44-1 to 44-3. Thus, the output of the integrated module 42 is a sum of these results of calculations multiplied by the coefficients W1 to W3.

The coefficients W1 to W3 of the gates 44-1 to 44-3 are weighted in inverse proportion to the recognitions errors, that is, so that the smaller the recognition error, the larger is the weighting applied to the local module output.

Moreover, in this case, the parameters of the local modules 43-1 to 43-3 are P1, P2 and P3, respectively. Of these parameters, the parameter of the local module 43-2 substantially corresponds to the movement pattern shown in FIG. 11.

Figure 23:
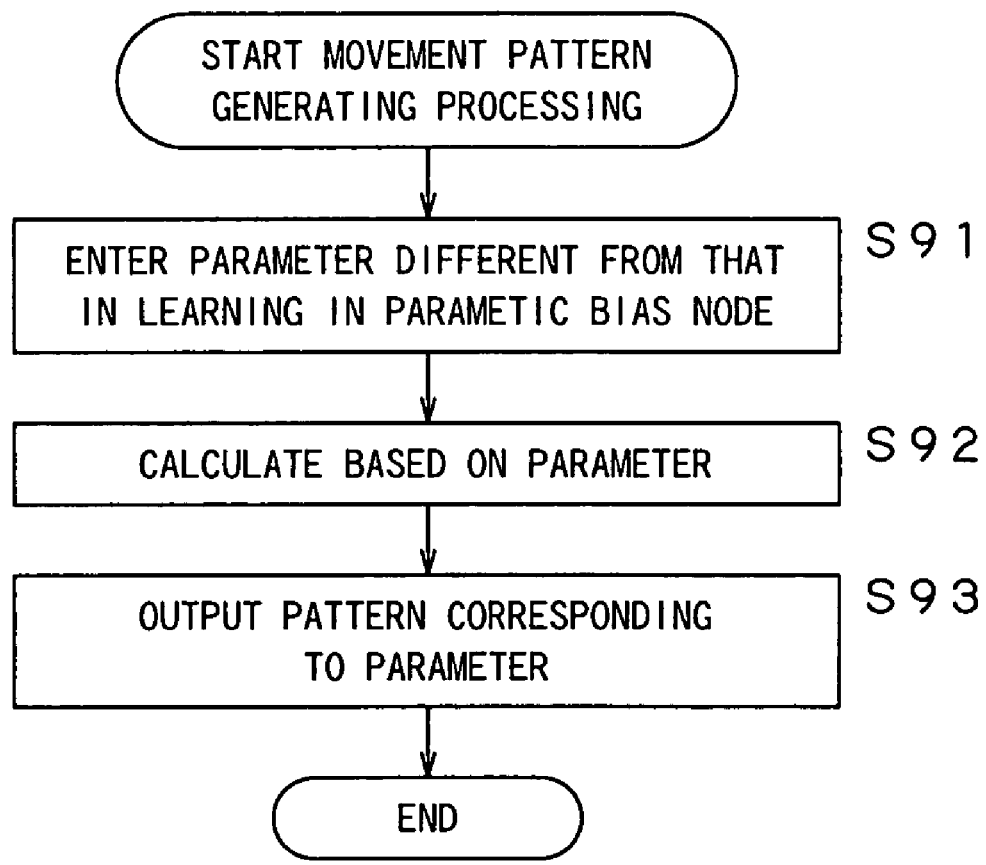
FIG. 23 is a flowchart for illustrating the movement pattern generating processing.

FIG. 23 shows an example of the processing for generating the movement pattern as typical of the use processing in the step S3 of FIG. 4.

First, in a step S91, parameters of preset values, different from those at the time of the learning, are entered to the parametric bias nodes 111-2 of the local modules 43-1 to 43-3. In a step S92, the intermediate layer 112 performs calculations based on the parameters entered to the parametric bias nodes 111-2 in the processing of the step S91. In a step S93, the neuron 113-1 of the RNN 61 outputs data of a pattern in keeping with the parameters entered in the processing of the step S91. The data of the respective patterns are multiplied with the coefficients W1 to W3, by the gates 44-1 to 44-3, respectively, summed together and sent out as output.

Figure 24:
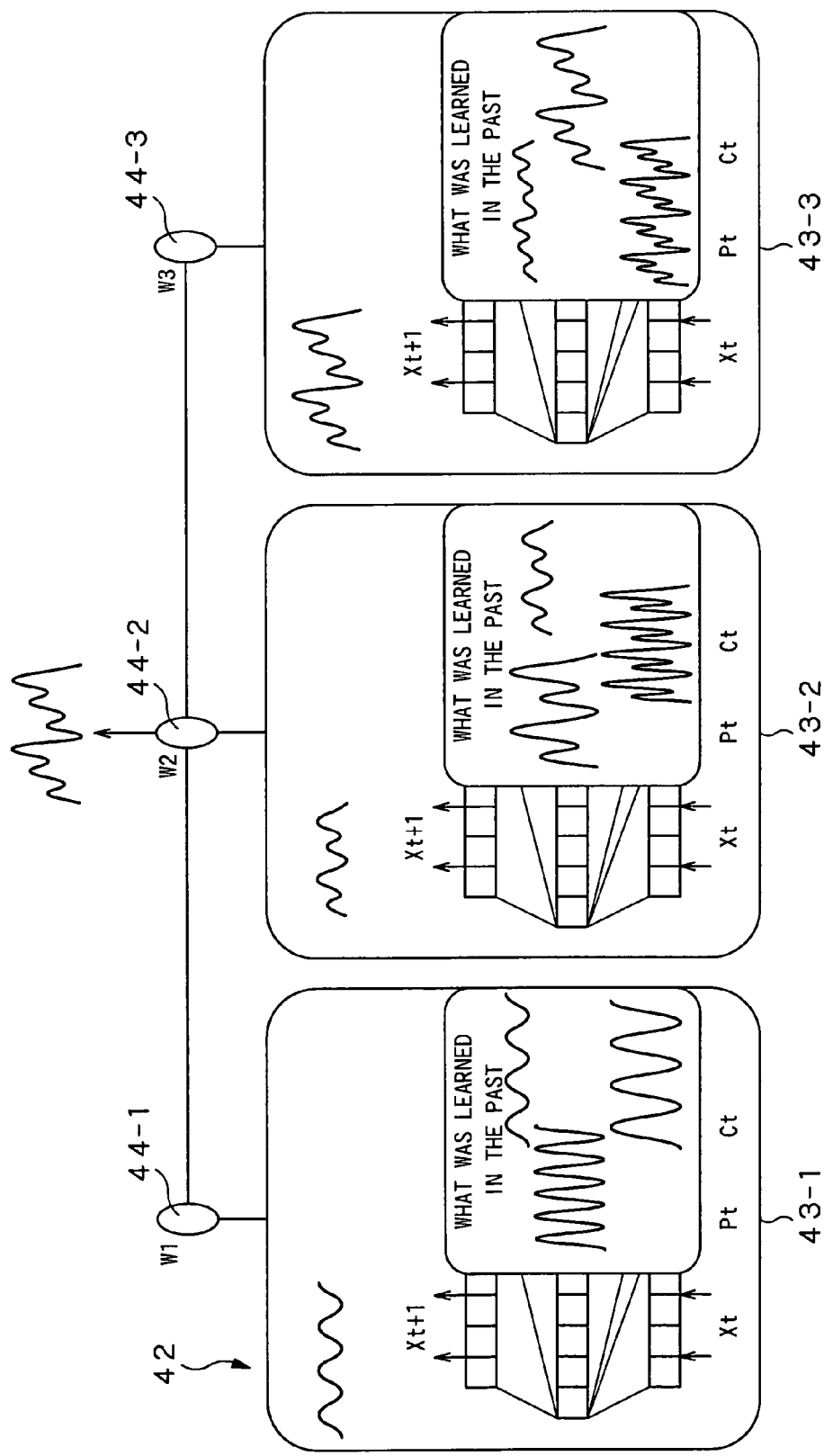
FIG. 24 illustrates the processing of generating the movement pattern.

FIG. 24 shows a case where the movement pattern is generated in the manner described above. In the case of FIG. 24, parameters P11 to P13 of the values which are in keeping with the movement patterns not learned so far are entered to the local modules 43-1 to 43-3. The coefficients W1 to W3 of the gates 44-1 to 44-3 are set to the values which are in keeping with the recognition errors calculated in the respective local modules 43-1 to 43-3. The result is that the movement pattern analogous with the movement pattern learned so far and which has not been learned is generated as a movement pattern.

The movement patterns may also be classified on the basis of the correlation with pre-learned learning patterns.

In the foregoing, the number of the local modules 43 is assumed to be three. This number may be increased, if desired, thereby extending the scale. Moreover, since the local modules are constructed by the RNN as the movement pattern learning model by the distributed expression scheme, plural movement patterns may be learned efficiently.

In the foregoing, only the local module with the smallest learning error performs the learning, that is, the learning is carried out in accordance with the so-called winner-take-all system. FIG. 25 shows such processing case.

In FIG. 25, the processing of steps S111 to S113 is similar to the processing of the steps S11 to S13 of FIG. 7. That is, by this processing, the learning parameters of the local modules 43-1 to 43-3 are saved and the movement patterns of the subject of learning are taken in by the local modules 43-1 to 43-3. The learning processing is carried out in these local modules 43-1 to 43-3.

In a step S114, the local modules 43-1 to 43-3 calculate the learning error ei (I=1, 2, 3). This learning error ei is calculated by the following equation:

$$e_i = \sum_{t=1}^{T} (d(t) - o_i(t))^2 \tag{5}$$

where d(t) denotes the movement pattern to be learned and o(t) is a output pattern obtained on learning.

In the next step S115, the respective local modules 43-1 to 43-3 calculate the weighting coefficients gi of respective learning parameter correction value Δwi based on the respective learning errors ei. The weighting coefficients gi may be expressed by the following equation:

$$g_i = \frac{\exp(e_i)}{\sum_{i=1}^{n} \exp(e_i)} \tag{6}$$

In the next step S116, the local modules 43-1 to 43-3 execute the processing of restoring the pre-learning learning parameters, saved in the processing of the step S111, to the original state. In a step S117, the local modules 43-1 to 43-3 execute the processing of correcting the pre-learning learning parameters, restored to the original state by the processing of the step S116, based on the weighting coefficients gi as found by the processing of the step S115, in accordance with the following equation:

$$\Delta w'_i = (1 - g_i) \Delta w_i \tag{7}$$

That is, the result of correction to Δw'i of the correction value Δwi, obtained by the learning processing in the step S113, is that, the smaller the learning error, the more is the learning performed, and the larger the learning error, the less is the learning performed. Stated differently, with the present processing, the learning processing, carried out in the step S113, is aimed to obtain a learning error, and the substantial learning is carried out in the step S117.

In the next step S118, it is checked whether or not the learning of the totality of the movement patterns has come to a close. If there is any unlearned movement pattern left, processing reverts to the step S111, and the processing as from this step is executed repeatedly. If it is determined in a step S118 that the learning of the totality of the learning patterns has come to a close, the learning processing is terminated.

In case the correlation of the movement patterns, learned by the local modules 43-1 to 43-3, is low, such that the movement patterns are independent of one another, the learning efficiency is improved by the learning processing of the winner-take-all system shown in FIG. 7. Conversely, if movement patterns correlated to a more or less extent with the learning patterns learned by the plural local modules, the learning processing may be improved with the learning processing explained with reference to FIG. 25.

In the foregoing, the present invention has been explained in connection with movement patterns. The present invention may, however, be applied to a time-series pattern in general. If a pattern prescribing the robot motion is used as a movement pattern (time-series pattern), the present invention may be applied for controlling an autonomous robot.

The above-described sequence of processing operations may be executed by the hardware or by the software. In this case, a personal computer 160, shown for example in FIG. 26, may be used.

Figure 26:
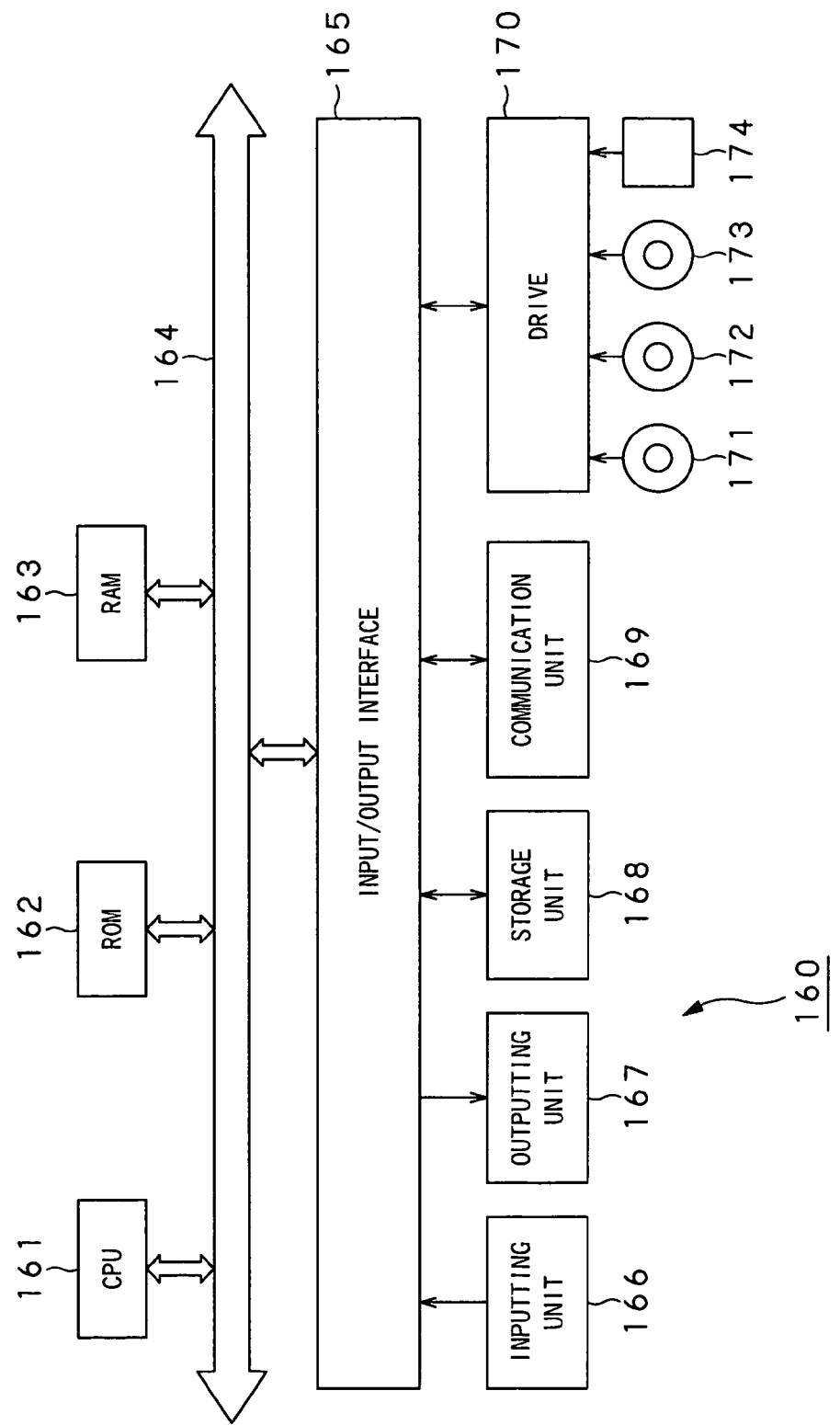
FIG. 26 is a block diagram showing an illustrative structure of a personal computer embodying the present invention.

In FIG. 26, a CPU (central processing unit) 161 executes various processing operations in accordance with a program stored in a ROM (read-only memory) 162 or a program loaded from a storage unit 168 to a RAM (random-access memory) 163. In the RAM 163, data needed for the CPU 161 to execute various processing operations are also stored.

The CPU 161, ROM 162 and the RAM 163 are interconnected over a bus 164. To this bus 164 is also connected an input/output interface 165.

To the input/output interface 165, an inputting unit 166, such as a keyboard or a mouse, a display, such as CRT or LCD, an outputting unit 167, such as a loudspeaker, a storage unit 168, such as a hard disc, and a communication unit 169, such as a terminal adapter, are connected. The communication unit 169 executes communication processing over a network.

To the input/output interface 165, a drive 170 is connected as necessary. A magnetic disc 171, an optical disc 172, a magneto-optical disc 173 or a semiconductor memory 174 is loaded in position and a computer program read out therefrom is installed as necessary on the storage unit 168.

When a sequence of processing operations is executed by the software, the program forming the software is installed to the personal computer from the network or from the recording medium.

The recording medium may be formed by package mediums, distributed for providing a program to a user, apart from the main body unit of the apparatus, such as a magnetic disc 171 (inclusive of a floppy disc), an optical disc 172 (inclusive of a CD-ROM (Compact Disc read-Only Memory) or a DVD (Digital Versatile Disc)), or a magneto-optical disc (inclusive of MD (Mini-Disc)) or a semiconductor memory 174. These discs or memory include a program recorded thereon. In addition, the recording medium may be formed by a ROM 162, provided to the user as it is pre-mounted in the main body unit of the apparatus, and having the program recorded thereon, or a hard disc included in the storage unit 168.

In the present description, the steps stating the program recorded on a recording medium include not only the operations carried out chronologically in accordance with the order specified herein but also the processing operations carried out batch-wise or in parallel.

What is claimed is:

1. An information processing apparatus for learning a time-series pattern corresponding to a trajectory so as to control movement of a device, comprising:
   a first movement pattern learning unit configured to learn the time-series pattern using a distributed expression scheme;
   a second movement pattern learning unit configured to learn the time-series pattern using the distributed expression scheme; and
   a third movement pattern learning unit having said first movement pattern learning unit and the second movement pattern learning unit as elements, the third movement pattern learning unit configured to generate, in response to input parameter values, a time series pattern to control movement of the device,
   wherein said first movement pattern learning unit and the second movement pattern learning unit are each formed by a recurrent neural network (RNN) provided with an operating parameter for switching a mechanical structure of the RNN.

2. The information processing apparatus according to claim 1, wherein said first movement pattern learning unit and the second movement pattern learning unit each (1) calculate a learning error, (2) calculate a weighting coefficient of a correction amount of a learning parameter based on said learning error, and (3) correct said learning parameter based on said weighting coefficient.

3. An information processing method for learning a time-series pattern corresponding to a trajectory so as to control movement of a device, said method comprising:
   learning a plurality of first time-series patterns by a first movement pattern learning unit using a distributed expression scheme;
   learning a plurality of second time-series patterns by a second movement pattern learning unit using the distributed expression scheme; and
   generating, in response to input parameter values, a time-series pattern to control movement of the device by a third movement pattern learning unit having said first movement pattern learning unit and the second movement pattern learning unit as elements,
   wherein said first movement pattern learning unit and the second movement pattern learning unit are each formed by a recurrent neural network (RNN) provided with an operating parameter for switching a mechanical structure of the RNN.

4. The information processing method according to claim 3, further comprising:
   calculating a first learning error of said first movement pattern learning unit and a second learning error of the second movement pattern learning unit;
   calculating weighting coefficients of correction values of the learning parameters of said first movement pattern learning unit and said second movement pattern learning unit based on said learning errors; and
   correcting said learning parameters of said first movement pattern learning unit and said second movement pattern learning unit based on said weighting coefficients.

5. The information processing method of claim 4, further comprising:
   determining whether the first learning error is smaller than the second learning error.

6. A program storage medium having stored therein a program for an information processing apparatus configured to learn a time-series pattern corresponding to a trajectory so as to control movement of a device, said program allowing a computer to execute the steps of:
   learning a plurality of first time-series patterns by a first movement pattern learning unit using a distributed expression scheme;
   learning a plurality of second time-series patterns by a second movement pattern learning unit using the distributed expression scheme; and
   generating, in response to input parameter values, a time-series pattern to control movement of the device by a third movement pattern learning unit having said first movement pattern learning unit and the second movement pattern learning unit as elements, wherein said first movement pattern learning unit and the second movement pattern learning unit are each formed by a recurrent neural network (RNN) provided with an operating parameter for switching a mechanical structure of the RNN.

7. The program storage medium according to claim 6, further comprising:

calculating a first learning error of said first movement pattern learning unit and a second learning error of the second movement pattern learning unit;

calculating weighting coefficients of correction values of the learning parameters of said first movement pattern learning unit and said second movement pattern learning unit based on said learning errors; and correcting said learning parameters of said first movement pattern learning unit and said second movement pattern learning unit based on said weighting coefficients.

* * * * *